(12) United States Patent
Ioki

(10) Patent No.: US 10,891,454 B2
(45) Date of Patent: Jan. 12, 2021

(54) INFORMATION READING APPARATUS AND INFORMATION READING SYSTEM

(71) Applicant: DENSO WAVE INCORPORATED, Aichi-pref. (JP)

(72) Inventor: Takahiro Ioki, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 16/295,549

(22) Filed: Mar. 7, 2019

(65) Prior Publication Data

US 2019/0278958 A1  Sep. 12, 2019

(30) Foreign Application Priority Data

Mar. 8, 2018 (JP) ................... 2018-041727
Jan. 15, 2019 (JP) ................... 2019-004139

(51) Int. Cl.
*G06K 7/10* (2006.01)
*G06Q 10/08* (2012.01)
*G06Q 10/06* (2012.01)

(52) U.S. Cl.
CPC ........... *G06K 7/10475* (2013.01); *G06K 7/10* (2013.01); *G06K 7/10009* (2013.01); *G06K 7/10198* (2013.01); *G06K 7/10386* (2013.01); *G06K 7/10722* (2013.01); *G06Q 10/06311* (2013.01); *G06Q 10/087* (2013.01)

(58) Field of Classification Search
CPC .. G06K 7/10475; G06K 7/10; G06K 7/10009; G06K 7/10198; G06K 7/10386; G06K 7/10722; G06Q 10/06311; G06Q 10/087

USPC ........................................................ 340/10.1
See application file for complete search history.

(56) References Cited

U.S. PATENT DOCUMENTS

| 7,837,113 | B2 * | 11/2010 | Field ................. G06K 7/10851 235/462.46 |
| 2004/0135674 | A1 * | 7/2004 | Shanks ................ G06K 7/0008 340/10.1 |
| 2008/0010111 | A1 | 1/2008 | Suto |
| 2008/0129485 | A1 | 6/2008 | Tuttle |
| 2010/0123562 | A1 | 5/2010 | Hiramatu et al. |

(Continued)

FOREIGN PATENT DOCUMENTS

GB 2434239 A 7/2007

*Primary Examiner* — Yong Hang Jiang
(74) *Attorney, Agent, or Firm* — Oliff PLC

(57) ABSTRACT

An information reading apparatus includes an information reading section, a communication section, a memory, a first determination section, a second determination section, and a control unit. In the apparatus, every time data is determined to be unread data (i.e., data read by one information reading apparatus but not shared yet by all of a plurality of information reading apparatuses) by the first determination section, the control unit records the unread data in the memory, while transmitting the unread data to other information reading apparatuses through the communication section. The control unit also records data determined to be unread data by the second determination section in the memory. A plurality of such information reading apparatuses are employed in an information reading system in which each information reading apparatus can easily keep track of the entire progress of reading tasks.

18 Claims, 9 Drawing Sheets

(56) References Cited

U.S. PATENT DOCUMENTS

2010/0225445 A1\* 9/2010 Huang ................. G06K 7/0008
340/10.1

\* cited by examiner

INFORMATION READING APPARATUS AND INFORMATION READING SYSTEM

CROSS-REFERENCE TO RELATED APPLICATION

This application is based on and claims the benefit of priority from earlier Japanese Patent Applications No. 2018-41727 filed Mar. 8, 2018 and No. 2019-004139 filed Jan. 15, 2019, the descriptions of which are incorporated herein by reference.

BACKGROUND

Technical Field

The present disclosure relates to an information reading apparatus and an information reading system.

Related Art

There has been proposed information management systems utilizing information reading apparatuses, such as radio tag readers or information code readers. With such a system, radio tags or information codes attached to objects to be managed are read by a radio tag reader or an information code reader to efficiently manage the objects. For example, commercial goods or the like stored in a warehouse may be read by a plurality of terminals, which serve as radio tag readers, operated by the respective workers to efficiently take an inventory of these goods.

When an inventory is taken of the goods through radio tags by a plurality of workers simultaneously, the individual workers cannot grasp the progress of the entire tasks. Therefore, needless talks of reading radio tags that have already been read by other workers may have to be performed. In particular, when taking an inventory of goods through radio tags, all the workers usually carry out their tasks without knowing which radio tags have been read by other workers. Therefore, unless the read data is compiled by a server or the like, it is difficult to keep track of the entire progress of the tasks. As measures against this, reading tasks may be performed by sectioning the work floor for each worker; however, there is a concern that different workers may read the same radio tags near the boundaries of sections and thus there may still be a high probability of performing unnecessary tasks.

In this regard, for example, there is known a management system as disclosed in WO 2006/095410. In this management system, an IC tag is attached to each shelf for which an inventory survey is to be carried out, and before taking inventory of the goods of the shelf, the worker operates her/his mobile terminal to change the first progress information recorded on the IC tag to "Being inventoried". Then, after completing the inventory survey, the worker operates her/his mobile terminal to change the first progress information recorded on the IC tag to "Inventoried". Thus, by confirming the first progress information recorded on the IC tags of the respective shelves, inventory progress of the shelves can be ascertained using the individual mobile terminals.

With the configuration as disclosed in WO 2006/095410 set forth above, a radio tag is attached to each shelf in which objects to be managed are stored with radio tags being respectively attached thereto. Accordingly, both the radio tag of the shelf and those of the objects are required to be managed. For this reason, management of radio tags becomes complicated, or moreover, the configuration set forth above cannot be necessarily used in an environment where radio tags cannot be attached to shelves. Furthermore, in the case of information code readers which optically read information codes, the function as a radio tag reader is required to be imparted to these code readers. Thus, information reading apparatuses to which the above configuration can be applied are unavoidably limited to those which have a function as a radio tag reader.

SUMMARY

It is thus desired to provide a configuration with which the individual information reading apparatuses can easily keep track of the entire progress of tasks, without the need of allowing a server or the like to compile data of the individual information reading apparatuses.

According to a first mode of the present disclosure, there is provided an information reading apparatus, including: an information reading section reading data recorded on a reading target; a communication section that establishes radio communication with one or more other information reading apparatuses; a memory that records the data read by the information reading section; a first determination section that, every time the data is read by the information reading section, determines whether the read data is unread data that has not been recorded yet in the memory; a second determination section that determines whether data received from each of the other information reading apparatuses through the communication section is the unread data; and a control unit that controls data recorded in the memory. The control unit is configured to: i) record the unread data in the memory and transmit the unread data in the memory when the first determination section determines that the read data is the unread data, and ii) store the data determined to be unread data by the second determination section in the memory.

According to the first mode, every time data is read by the information reading section, the first determination section determines whether the data is previously unread data that is not recorded in the memory. Also, the second determination section determines whether data received from another information reading apparatus through the communication section is unread data. Every time data is determined to be unread data by the first determination section, the control unit records the unread data in the memory and transmits the unread data to other information reading apparatuses through the communication section. Also, the control unit records data determined to be unread data by the second determination section in the memory.

With this configuration, every time unread data is read, the unread data is transmitted to other information reading apparatuses and recorded in the respective memories. Thus, all the information reading apparatuses located in an area of the communication range can have common data in the respective memories in real time. Accordingly, each information reading apparatus can keep track of the entire reading progress without the need of allowing a server or the like to compile data of the individual information reading apparatuses. Consequently, reading tasks can be efficiently performed.

According to a second mode of the present disclosure, the control unit transmits all the read data recorded in the memory to other information reading apparatuses through the communication section at a predetermined time point. With this configuration, if part of unread data transmitted from another information reading apparatus in real time cannot be received, the unread data in question is received at the predetermined time point. Thus, data can be efficiently shared between the information reading apparatuses.

According to a third mode of the present disclosure, if data is determined to be unread data by the second determination section, the control unit records the unread data in the memory, while transmitting the unread data to other information reading apparatuses through the communication section. With this configuration, the unread data received from another information reading apparatus is transmitted to other information reading apparatuses. Therefore, between information reading apparatuses that cannot directly communicate with each other, unread data can be transmitted to them being relayed through another information reading apparatus. Thus, data can be reliably shared between the information reading apparatuses.

According to a fourth mode of the present disclosure, unread data is provided with transmission count that indicates the number of times of transmitting the unread data to other information reading apparatuses. The information reading apparatus includes an increment section that increments the transmission count assigned to the unread data, the transmission count being incremented when the control unit transmits the unread data. If data is determined to be unread data by the second determination section, the control unit records the unread data in the memory, and transmits the unread data, whose transmission count is not more than a first predetermined count, to other information reading apparatuses through the communication section.

If there are a large number of information reading apparatuses to share data with, there may be produced a large amount of needless communication tasks of transmitting the same unread data to one information reading apparatus from other plurality of information reading apparatuses. This is because the individual information reading apparatuses substantially simultaneously perform the processing of transmitting data, which is received from another information reading apparatus, to other information reading apparatuses.

In this regard, in the present disclosure, a transmission count is assigned to unread data and incremented every time the unread data is transmitted to other information reading apparatuses, and the unread data whose transmission count is not more than the first predetermined count is ensured to be transmitted to other information reading apparatuses. Thus, the unread data whose transmission count has exceeded the first predetermined count will no longer be transmitted to other information reading apparatuses. Accordingly, even when there a large number of information reading apparatuses to share data with, needless communication tasks are minimized by adequately determining the first predetermined count according to the number of information reading apparatuses.

According to a fifth mode of the present disclosure, a count section counts, as a determination count, the number of times of consecutively determining data as not being unread data by the first determination section, and a notification section issues a predetermined notification if the determination count exceeds a second predetermined count.

With this configuration, when a worker continues the reading task entering a region where data has already been read by another worker, the determination count should exceed the second predetermined count and the predetermined notification should be issued. This is because, even if this worker in question has not read the data by herself/himself in the past, the data received from the another worker has already been recorded in the memory of this worker in question.

Thus, since the worker in question who has been given the predetermined notification can easily know her/his entry into a region where data has already been read by the other worker, needless reading tasks are minimized. In particular, each worker, who can move avoiding issuance of the predetermined notification, can be directed to a region where data has not been read by another worker.

According to a sixth mode of the present disclosure, an information reading system is configured so as to include a plurality of information reading apparatuses described above. Thus, in the system, each information reading apparatus can keep track of the entire reading progress without the need of allowing a server or the like to compile data of the individual information reading apparatuses.

According to a seventh mode of the present disclosure, the system includes a server that is capable of acquiring data recorded in the memory, from at least any one of a plurality of information reading apparatuses used in a predetermined reading task area. The server includes a task tracking section that keeps track of progress of reading performed in the predetermined reading task area, based on the data acquired from the information reading apparatus, i.e. data shared between the information reading apparatuses (this data may be termed common data hereinafter).

With this configuration, the server can acquire common data from any one of the information reading apparatuses used in the predetermined reading task area, eliminating the process of acquiring data from all the information reading apparatuses and of compiling the acquired data. Thus, the server can also easily keep track of the progress of reading. Furthermore, the manager or the like of the server can make an adjustment of improving the efficiency of the tasks of the entire reading task area by changing positioning of the workers, increasing workers, or the like, according to the progress of the tasks.

DETAILED DESCRIPTION OF THE PREFERRED EMBODIMENTS

First Embodiment

With reference to the accompanying drawings, a description will be given of a first embodiment embodying an information reading system which includes a plurality of information reading apparatuses according to the present disclosure.

With reference to FIGS. 1 to 5 and FIG. 9, the information reading system according to the first embodiment will now be detained.

Figure 1:
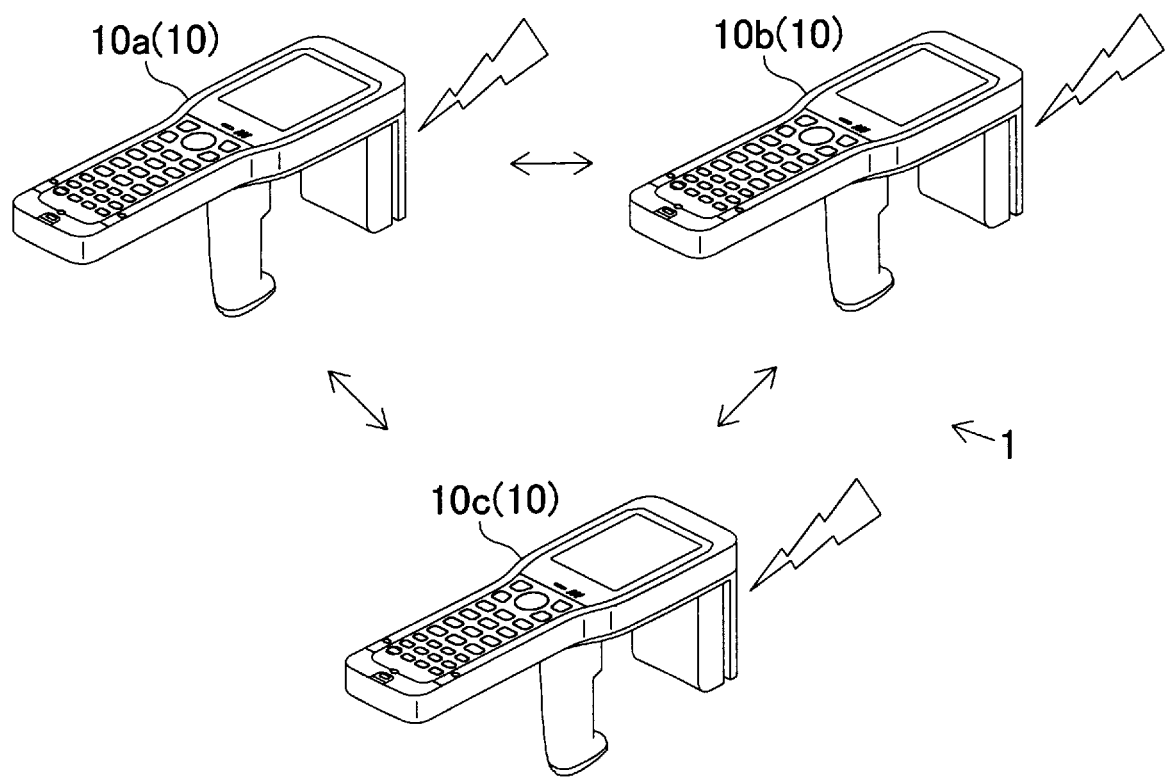
FIG. 1 is a schematic diagram illustrating a configuration of an information reading system, according to a first embodiment of the present disclosure.

FIG. 1 shows an information reading system 1 which is configured to include a plurality of information reading apparatuses each of which is capable of reading data recorded on a target to be read (this target may be termed reading target hereinafter). In the present embodiment, the information reading system 1 is configured to read a radio tag (radio count ID tag, or RFID tag) 50, or a reading target, and to include three information reading apparatuses 10, i.e. a first terminal 10a, a second terminal 10b, and a third terminal 10c, capable of reading data recorded on the radio tag 50.

Figure 2A:
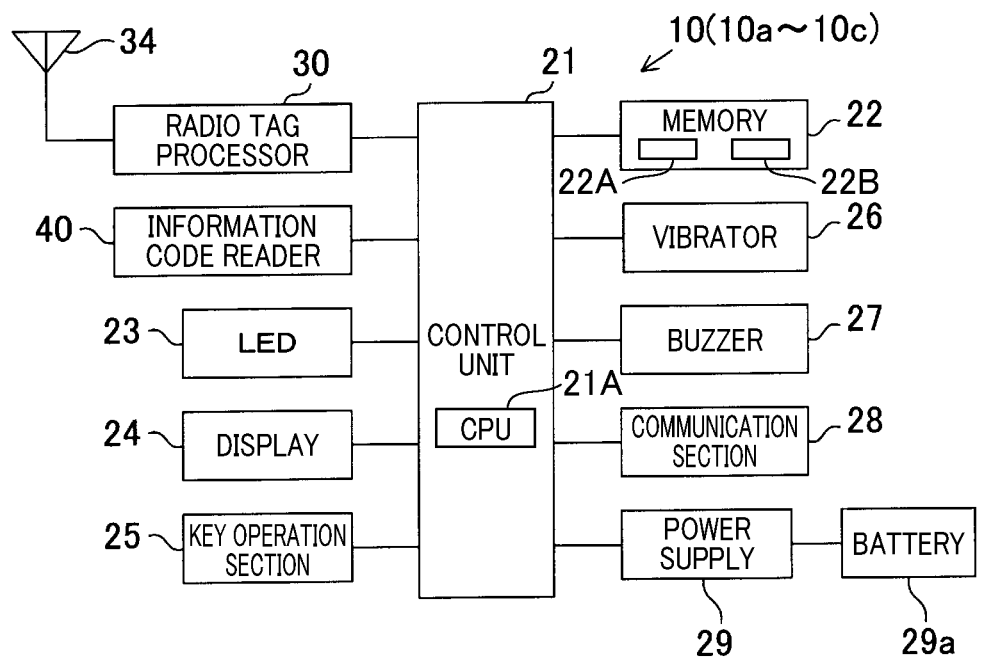
FIG. 2A is a block diagram illustrating an electrical configuration of a first terminal illustrated in FIG. 1.
Figure 2B:
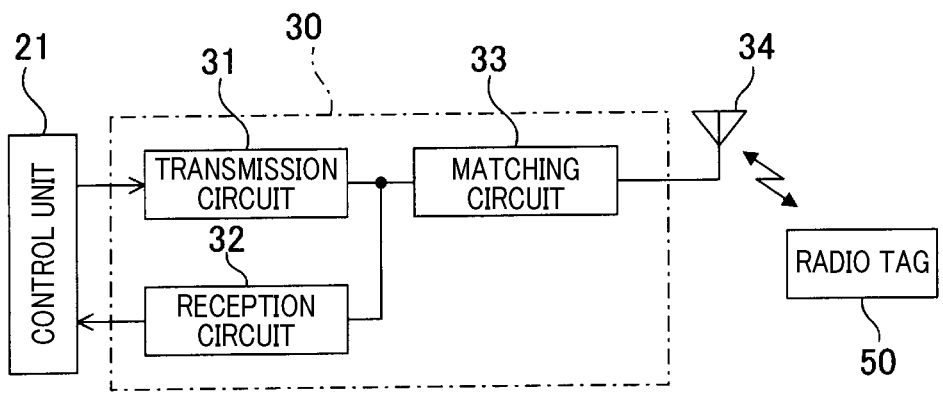
FIG. 2B is a schematic block diagram illustrating a radio tag processor illustrated in FIG. 2A.
Figure 2C:
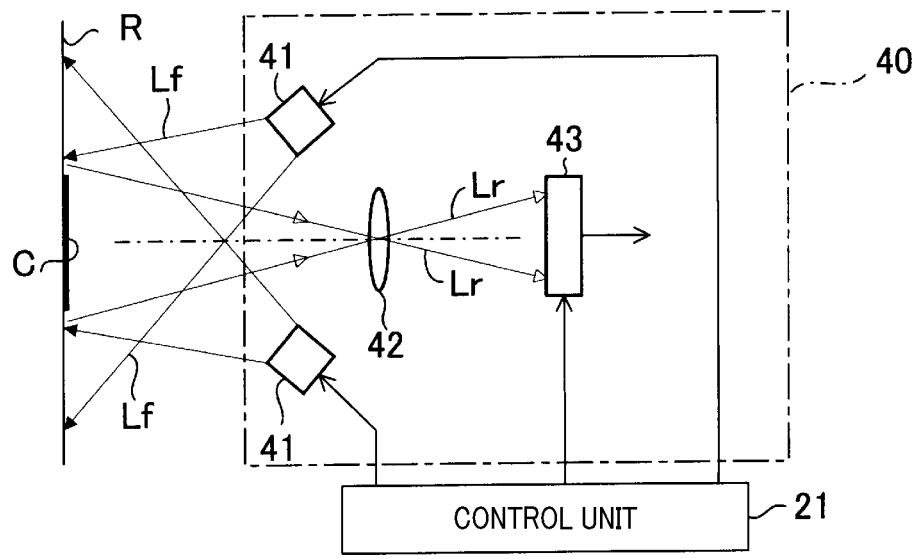
FIG. 2C is a schematic block diagram illustrating an information code reader illustrated in FIG. 2A.

Since the first, second and third terminals 10a, 10b and 10c serving as information reading apparatuses have the same functions, the following description will be specifically provided, taking the first terminal 10a as an example and referring to FIGS. 2A to 2C.

The first terminal 10a is configured as a mobile information reading terminal carried by a worker (user) for use in various sites. The terminal 10a has a function of reading and writing information from/into the information recorded on the radio tag 50, via radio waves transmitted from or received by antennas. The first terminal 10a also has a function as an information code reader that reads an information code C, such as a barcode or a two-dimensional code. Specifically, the first terminal 10a is configured such that two types of reading can be performed.

The first terminal 10a has a housing in which a control unit 21 is provided, as shown in FIG. 2A, for overall control of the first terminal 10a. The control unit 21 is mainly configured by a microcomputer, and includes a CPU, a system bus, and an input/output interface. The control unit 21 configures an information processor together with a memory 22. The memory 22 is configured, for example, by a semiconductor memory device, such as a RAM 22A (e.g., DRAM or SRAM), a ROM 22B (e.g., EPROM or EEPROM), or the like.

The memory 22, precisely, the ROM 22B, stores a program for executing a process of reading the radio tag 50 through radio communication, a program for executing a decoding process that is a process of optically reading a captured image of information code, or other programs. The control unit 21 is connected to a LED 23, a display 24, a key operation section 25, a vibrator 26, a buzzer 27, a communication section 28, and the like. The ROM 22B serves as a non-transient computer readable recording medium in which computer-readable programs for various processes are stored in advance.

The key operation section 25 is configured to output an operation signal to the control unit 21. In response to the operation signal, the control unit 21 performs operation accordingly. The LED 23, the display 24, the vibrator 26, and the buzzer 27 are configured to be controlled by the control unit 21, i.e. to be activated upon reception of a command from the control unit 21.

The communication section 28 is a radio communication means which can perform direct short-range radio communication with one or more other information reading apparatuses (e.g., the second and third terminals 10b and 10c). Specifically, for example, the communication section 28 is configured to have a Bluetooth (trademark) function or a near field communication (NFC) function. The housing also includes a power supply 29 or a battery 29a. The power supply 29 or the battery 29a is ensured to supply electrical power to the control unit 21 and various electrical components.

The control unit 21 is connected to a radio tag processor 30 and an information code reader 40 respectively serving as information reading sections.

Referring to FIG. 2B, the radio tag processor 30 will be described.

The radio tag processor 30 electromagnetically communicates with the radio tag 50 collaborating with an antenna 34 and the control unit 21 to read data recorded on the radio tag 50 or write data into the radio tag 50. The radio tag processor 30 is configured as a circuit for performing well-known radio transmission, and includes, as schematically shown in FIG. 2B, a transmission circuit 31, a reception circuit 32, and a matching circuit 33.

The transmission circuit 31 is configured by a carrier oscillator, an encoder, an amplifier, a transmission filter, a modulator, and the like, and is ensured to allow the carrier oscillator to output carrier waves of a predetermined count. The encoder is connected to the control unit 21 to encode transmission data outputted from the control unit 21 and output the encoded data to the modulator.

The modulator receives an input of carrier waves from the carrier oscillator and transmission data from the encoder. The modulator generates a modulated signal resulting from amplitude shift keying (ASK) modulation, and outputs the ASK-modulated signal to the amplifier. This ASK modulation is performed based on an encoded transmission code (modulation signal) outputted from the encoder toward the carrier waves outputted from the carrier oscillator when a command is transmitted to a communication object.

The amplifier amplifies the inputted signal, i.e. the signal modulated by the modulator, at a predetermined gain, and outputs the amplified signal to a transmission filter. The transmission filter filters the amplified signal inputted from the amplifier, and outputs the filtered signal to the antenna 34 as a transmission signal via the matching circuit 33. When the transmission signal is outputted to the antenna 34 in this way, the transmission signal is radiated outside as transmission radio waves by the antenna 34.

A response signal received by the antenna 34 is inputted to the reception circuit 32 via the matching circuit 33. The reception circuit 32 is configured by a reception filter, an amplifier, a demodulator, a binary processor, a decoder, and the like. The reception circuit 32 allows the reception filter to filter the response signal received via the antenna 34, allows the amplifier to amplify the filtered signal, and then allows the demodulator to demodulate the amplified signal. Then, the demodulated signal waveform is binarized by the binary processor, followed by decoding by the decoder, and the decoded signal is outputted to the control unit 21 as reception data.

Figure 3:
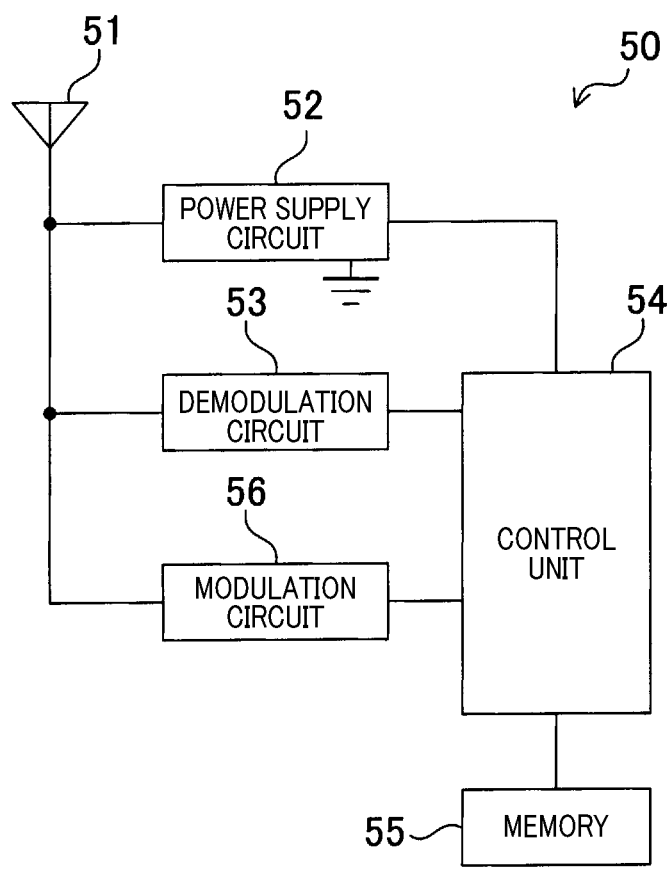
FIG. 3 is a schematic block diagram illustrating an electrical configuration of a radio tag, according to the first embodiment.

Referring now to FIG. 3, an electrical configuration of the radio tag 50, i.e. a target to be read by the first terminal 10a, will be described.

As shown in FIG. 3, the radio tag 50 is configured by an antenna 51, a power supply circuit 52, a demodulation circuit 53, a control circuit 54, a memory 55, a modulation circuit 56, and the like. The power supply circuit 52 rectifies and smooths a transmission signal (carrier signal) received from the first terminal 10a via the antenna 51 to generate an activation power. The power supply circuit 52 supplies the activation power to the individual constituent elements, including the control circuit 54.

The demodulation circuit 53 demodulates data superimposed on the transmission signal (carrier signal) and outputs the demodulated signal to the control circuit 54. The memory 55 stores information for identifying the radio tag 50 (tag ID), or data suitable for usage of the radio tag 50. The control circuit 54 is configured to output data or the like read from the memory 55 to the modulation circuit 56 as transmission data. The modulation circuit 56 applies the transmission data to the response signal (carrier signal) for load modulation and transmits the resultant signal via the antenna 51 as reflective waves.

Referring to FIG. 2C, the information code reader 40 will be described.

The information code reding section 40 optically reads an information code, and is configured, as shown in FIG. 2C, by a light-receiving sensor 43 constituted of a CCD area sensor, an image-forming lens 42, a plurality of luminaires 41 each constituted of a LED or lens, and the like. The information code reader 40 collaborates with the control unit 21 to read an information code C (barcode or two-dimensional code) attached to a commercial product or the like.

When an information code is read by the information code reader 40, the luminaires 41 emit illumination light Lf in response to a command from the control unit 21. The illumination light Lf is radiated to the information code C through a reading port. Then, reflected light Lr, i.e. the illumination light Lf reflected by the information code C, is taken into the apparatus through the reading port, and passed through the image-forming lens 42 for reception by the light-receiving sensor 43. The image-forming lens 42 disposed between the reading port and the light-receiving sensor 42 is configured to form an image of the information code C on the light-receiving sensor 43. The light-receiving sensor 43 outputs a light-receiving signal corresponding to the image of the information code C.

The light-receiving signal outputted from the light-receiving sensor 43 is recorded in the memory 22 (FIG. 2A) as image data, and is ensured to be used in decoding processing of acquiring information contained in the information code C. It should be noted that the information code reader 40 includes an amplification circuit for amplifying a signal from the light-receiving sensor 43, an AD conversion circuit for converting the amplified signal into a digital signal, or other circuits. However, these circuits are omitted in FIG. 2C.

The first terminal 10a configured as described above allows the radio tag processor 30 to read data (tag ID, etc.) recorded on the radio tag 50. As will be described later, the first terminal 10a performs transmission/reception communication with the second and third terminals 10b and 10c through the communication section 28 regarding the read data. This communication is performed during a reading process and a data transmission process performed by the control unit 21 to share the read data between the terminals. The second and third terminals 10b and 10c are each configured similarly to the first terminal 10a, and perform transmission/reception communication with other terminals regarding read data to share the data between the terminals.

Referring to the flow diagrams shown in FIGS. 4 and 5, a specific description will now be given of a reading process and a data transmission process parallelly performed by the control unit 21 (precisely, the CPU 21A) when the data read by each terminal is shared with other terminals. The following description will be specifically given, taking an example of a reading process performed by the control unit 21 of the first terminal 10a, in a situation where commercial goods and the like displayed on the shelves of a store are inventoried by having the first, second and third terminals 10a, 10b and 10c read the radio tags 50 attached to the respective goods. It should be noted that the communication sections 28 of the terminals 10a to 10c each have a configuration enabling direct radio communication between them in the store that is an inventory task area (reading task area).

Figure 4:
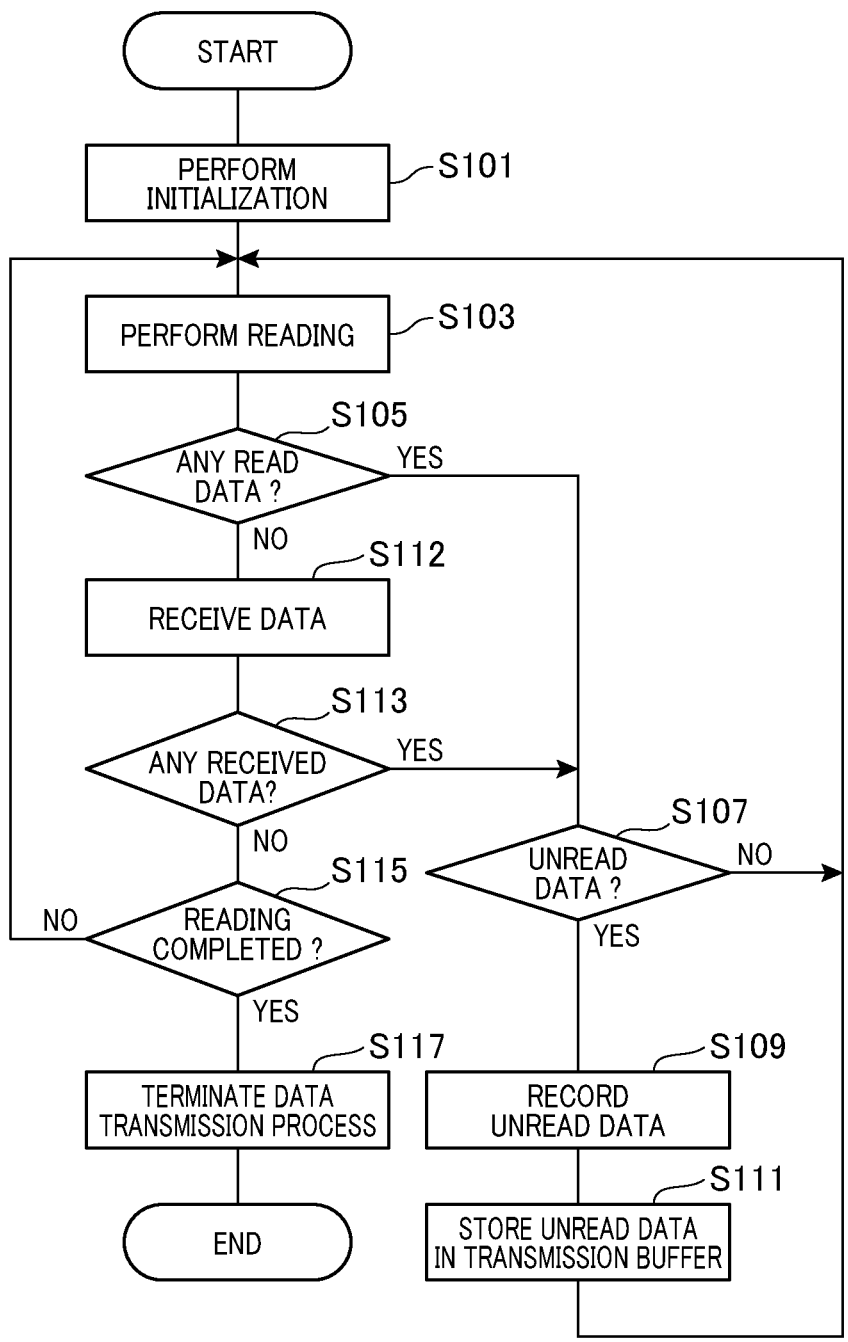
FIG. 4 is a flow diagram illustrating a reading process performed by a control unit, according to the first embodiment.

When the reading process is started by the control unit 21 following a predetermined operation of the key operation section 25 at the start of an inventory survey, initialization is performed at step S101 of FIG. 4. At this step, the second and third terminals 10b and 10c, which are located in an area of the direct radio communication range via the communication section 28, are determined as being transmitters/receivers of read data.

Then, at step S103, a process of reading a radio tag 50 is performed by using the radio tag processor 30 serving as an information reading section. Then, at step S105, it is determined whether any data has been read from a radio tag 50. If data recorded on a radio tag 50 has been read (Yes at step S105), control proceeds to step S107. At step S107, it is determined whether the read data is unread data that has not yet been recorded in the memory 22.

Hereinafter the "unread data" are referred to as data which has already been optically acquired but not stored yet in the memory 22 as shared data in the respective terminals 10a, 10b and 10c, for example, in the RAM 22A, so that such acquired data cannot be referred to as being "completely read" for information sharing.

If the read data is determined to be unread data (Yes at step S107), control proceeds to step S109 where the unread data is recorded in the memory 22. Then, at step S111, the unread data is stored in a transmission buffer formulated such as in the memory 22, for transmission to the second and third terminals 10b and 10c, i.e. other information reading apparatuses. Then, control returns to step S103, i.e. the first terminal 10a is brought into a state of reading a new radio tag 50. If the read data is determined to be already-read data, i.e. data already recorded in the memory 22 (No at step S107), the already-read data is deleted, and control returns to step S103, i.e. the first terminal 10a is brought into a state of reading a new radio tag 50.

It should be noted that the control unit 21, which makes a determination at step S107 as to whether the read data is unread data, may correspond to an example of the first determination section. A radio tag 50, if once read by the first terminal 10a, will no longer be a reading target of this first terminal 10a through a flag determination for example, and a "Yes" determination will no longer be made at step S105.

Figure 5:
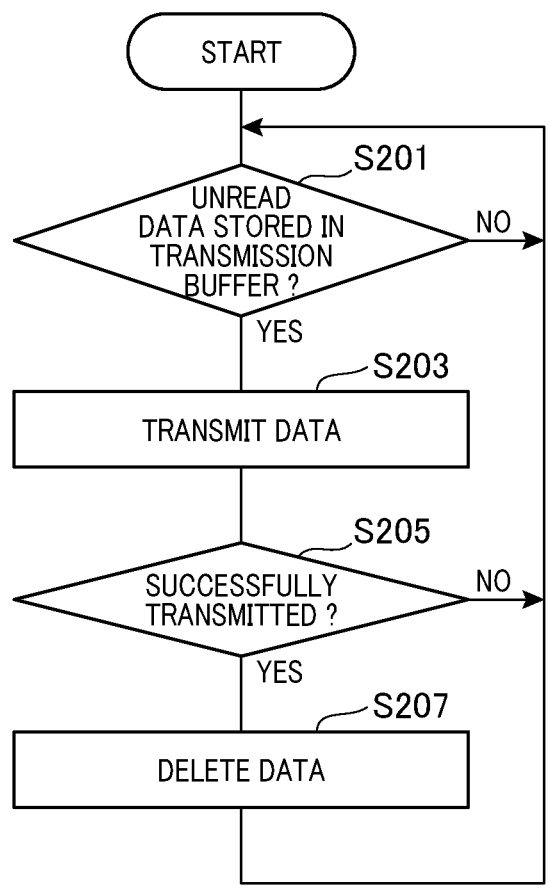
FIG. 5 is a flow diagram illustrating a data transmission process performed by the control unit.

With the initialization performed at step S101 of the reading process, a data transmission process shown in FIG. 5 is parallelly started. First, at step S201 of the data transmission process, it is determined whether data has been stored in the transmission buffer. If unread data is determined to have been stored in the transmission buffer as mentioned above (Yes at step S201), control proceeds to step S203 where the data is immediately transmitted to the second and third terminals 10b and 10c via the communication section 28. Then, at step S205, it is determined whether the transmission has been successful. If the transmission is successful (Yes at step S205), control proceeds to step S207 where the transmitted data is deleted from the transmission buffer. Then, control returns to step S201 to iterate this process.

In the reading process, if it is determined that data has not been read (No at step S105), control proceeds to step S112 to try to receive data from the second and third terminals 10b and 10c, and then to step S113 where it is determined whether any data has been received as a result of the data transmission process performed by the second terminal 10b or the third terminal 10c. If data is determined to have been received (Yes at step S113), control proceeds to step S107 where it is determined whether the received data is unread data. If the data is determined to be unread data (Yes at step S107), control proceeds to step S109 where the unread data is recorded in the memory 22. Then, at step S111, the unread data is stored in the transmission buffer formulated such as in the memory 22, for transmission to the second and third terminals 10b and 10c, i.e. other information reading apparatuses. The stored unread data are then transmitted to the second and third terminals 10b and 10c. Then, control returns to step S103, i.e. the first terminal 10a is brought into a state of reading a new radio tag 50.

It should be noted that transmission buffer may store unread data such that the terminal that has transmitted the unread data is excluded from transmission targets. If the received data is determined to be already-read data (No at Step S107), the already-read data is cancelled, and control returns to step S103, i.e. the first terminal 10a is brought into a state of reading a new radio tag 50. It should be noted that the control unit 21, which makes a determination at step S107 as to whether the received data is unread data, may correspond to an example of the second determination section.

Thus, unread data is immediately transmitted to other information reading apparatuses in the data transmission process parallelly performed with the reading process. Accordingly, data recorded in the memory 22 of each terminal is shared with the rest of the terminals in real time. If it is determined, at step S113, that there is no received data (No at step S113), control proceeds to step S115 where it is determined whether reading has been completed. Specifically, if the number of times of reading such shared (or common) data has reached a predetermined value, reading is determined to have been completed (Yes at step S115). Then, at step S117, the data transmission process is terminated to thereby terminate the present reading process.

As described above, in the information reading apparatus 10 of the present embodiment, every time data is read by the radio tag processor 30, it is determined whether the data is unread data that has not yet been recorded in the memory. Also, in the information reading apparatus 10, it is determined whether the data received from another information reading apparatus via the communication section 28 is unread data. Then, every time the read data is determined to be unread data by the control unit 21, the unread data is recorded in the memory, and at the same time, transmitted to other information reading apparatuses via the communication section 28. Also, received data that has been determined to be unread data is recorded in the memory 22.

Figure 9:
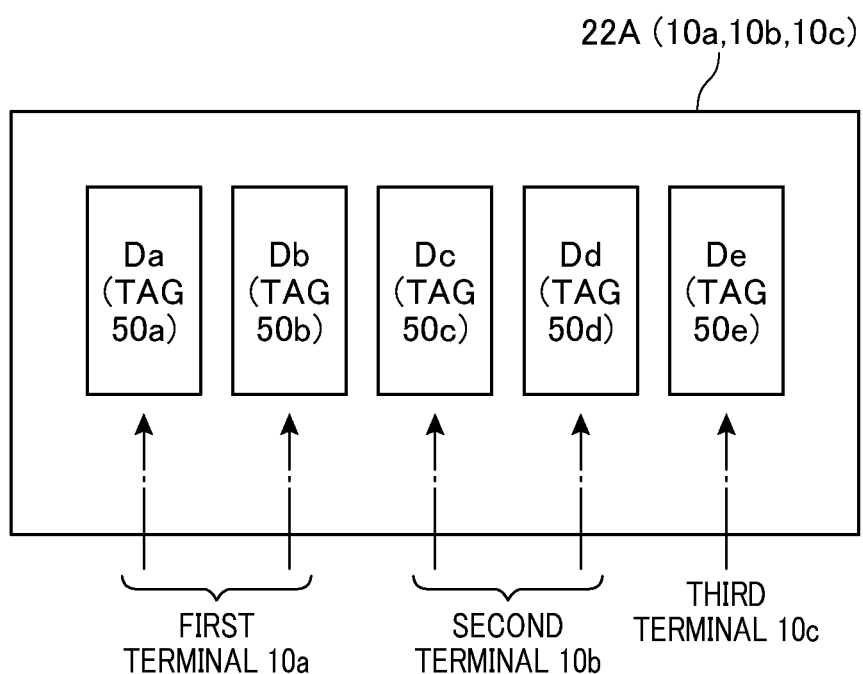
FIG. 9 is a pictorial illustration exemplifying a simple operation performed in the first embodiment.

By way of example, it is assumed that three operators use the first to third terminals 10a to 10c respectively to read fives RFID tags 50, i.e., first to fifth RFID tags 50a to 50e. This situation is true of divided work for reading many RFID tags and sharing read tag information to shorten a duration necessary for completing the entire reading work. For example, it can be assumed that the first terminal 10a is assigned to reading the first and second RFID tags 50a and 50b, the second terminal 10b is assigned to reading the third RFID tags 50c and 50d, and the third terminal 10c is assigned to reading the fifth RFID tag 50e. When the entire reading work is completed by the three operators, the unread RFID data Da to De respectively indicating information read serially or in almost parallelly, i.e., depending on the order of the operator's reading actions, from the first to fifth RFID tags 50a to 50e are stored as illustrated in FIG. 9 in each of the RAMs 22A of the memories 22 of the first to third terminals 10a to 10c, in which such stored unread data Da to De become already-read data which can be shared in the system 1. Hence, the first to third terminals 10a to 10c are able to have the shared tag information in a shorter work time.

Thus, since every time unread data is read, the unread data is transmitted to other information reading apparatuses and recorded in the respective memories 22, all the information reading apparatuses located in an area of the communication range can record common data for information sharing in the respective memories 22 in real time. In this way, the individual information reading apparatuses can keep track of the entire progress of tasks without the need of compiling data from the individual information reading apparatuses by using a server or the like. Consequently, operator's tasks can be performed efficiently.

In particular, every time data received from another information reading apparatus is determined to be unread data (Yes at step S113 and Yes at step S107), the unread data is recorded in the memory 22 and transmitted simultaneously to other information reading apparatuses via the communication section 28. Thus, the unread data received from another information reading apparatus is transmitted to other information reading apparatuses. Therefore, between information reading apparatuses that cannot directly communicate with each other, unread data can be transmitted to them being relayed through another information reading apparatus. Thus, data can be reliably shared between the information reading apparatuses.

Furthermore, the information reading system 1, which is configured by a plurality of information reading apparatuses (10a to 10c), enables the individual information reading apparatuses to easily keep track of the entire progress of tasks, without the need of allowing a server or the like to compile data of the individual information reading apparatuses.

As a modification of the present embodiment, the reading process may be performed by the control unit 21 such that all the read data recorded in the memory 22 is stored in the transmission buffer at a predetermined time point. The predetermined time point may be the time point after lapse of a predetermined time from the start of the reading process, or the time point when a predetermined operation has been performed for the key operation section 25.

Accordingly, at a predetermined time point, all the read data recorded in the memory 22 is transmitted to other information reading apparatuses via the communication section 28. Thus, if part of unread data transmitted in real time from another information reading apparatus cannot be received, this part of unread data can be received at the predetermined time point. Consequently, data can be efficiently shared between the information reading apparatuses.

Second Embodiment

An information reading apparatus and an information reading system according to a second embodiment will be described.

The second embodiment is different from the first embodiment in that the number of times of transmission is assigned to unread data. The components substantially identical with or similar to those of the first embodiment are given the same reference numerals to omit duplicate description.

When there are provided a large number of information reading apparatuses to share data with, the individual information reading apparatuses should substantially simultaneously perform the process of transmitting data received from another information reading apparatus to other information reading apparatuses. For example, let us assume a situation where twenty information reading apparatuses, including the first, second and third terminals 10a, 10b and 10c, are used in a predetermined reading task area. In this case, when data is shared between these information reading apparatuses, unread data that has been read by the first terminal 10a is transmitted to other information reading apparatuses as set forth below.

The first terminal 10a performs a process of transmitting unread data to other nineteen information reading apparatuses including the second and third terminals 10b and 10c. Then, the second terminal 10b that has received the unread data performs a process of transmitting the unread data to other nineteen information reading apparatuses including the first and third terminals 10a and 10c. Also, the third terminal 10c that has received the unread data performs a process of transmitting the unread data to other nineteen information reading apparatuses including the first and second terminals 10a and 10b. Similarly, each of the remaining information reading apparatuses that has received the unread data performs a process of transmitting the unread data to other nineteen information reading apparatuses.

Thus, the process of transmitting the received unread data to other nineteen information reading apparatuses is performed by each information reading apparatus. Accordingly, there may occur a number of needless radio communication tasks of transmitting the same unread data to one information reading apparatus from a plurality of other information reading apparatuses. For example, an information reading apparatus that has already received unread data from the first terminal 10a may receive the same unread data from other eighteen information reading apparatuses including the second and third terminals 10b and 10c.

In this regard, in the present embodiment, a transmission count N1 is assigned to unread data to indicate the number of times of transmitting the unread data to other information reading apparatuses. When the unread data is transmitted, the transmission count N1 assigned thereto is ensured to be incremented. Furthermore, unread data whose transmission count N1 is not more than a first predetermined count N1th is ensured to be transmitted to other information reading apparatuses, and unread data whose transmission count N1 has exceeded the first predetermined count N1th is ensured not to be transmitted to other information reading apparatuses to thereby minimize needless radio communication tasks. It should be noted that each information reading apparatus does not necessarily have to transmit unread data to other information reading apparatuses immediately after reception. For example, received unread data may be collectively transmitted to other information reading apparatuses after lapse of a predetermined time to minimize needless radio communication tasks.

Figure 6:
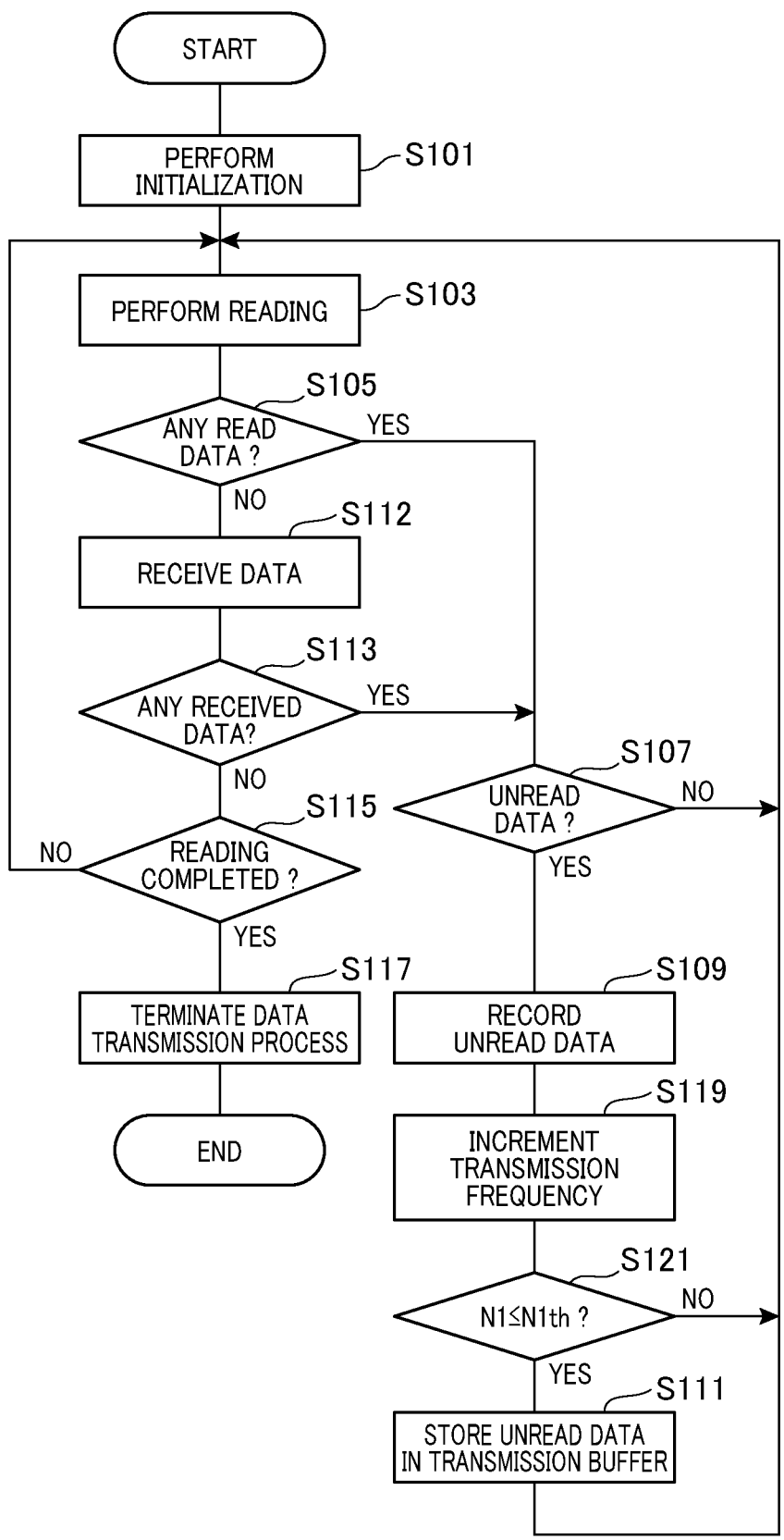
FIG. 6 is a flow diagram illustrating a reading process performed by a control unit, according to a second embodiment of the present disclosure.

Referring to FIG. 6, a reading process performed by the control unit 21 of the present embodiment will be specifically described.

When the reading process is started by the control unit 21 of the first terminal 10a, initialization is performed at step S101 shown in FIG. 6 to determine a plurality of information reading apparatuses including the second and third terminals 10b and 10c in a predetermined reading task area as being transmitters/receivers of read data.

Then, if the data recorded on a radio tag 50 is determined to have been read (Yes at step S105) and if the data is determined to be unread data (Yes at step S107), control proceeds to step S109 where the unread data is recorded in the memory 22. Then, at step S119, a transmission count increment process is performed, i.e. the transmission count N1 assigned to the unread data is incremented. If the unread data is data initially read by the information reading apparatus, it means that this unread data has not yet been transmitted and that no transmission count N1 has been assigned thereto. Accordingly, an initial transmission count N1, as 1, is assigned to the unread data at step S119. It should be noted that the control unit 21 that performs the transmission count increment process at step S119 may correspond to an example of the increment section.

Then, control proceeds to step S121 where it is determined whether the transmission count N1 assigned to the unread data is not more than the first predetermined count N1th. The first predetermined count N1th refers to a threshold that is determined based on the number of information reading apparatuses used in the predetermined reading task area, or the radio communication range of the information reading apparatuses, or the like. For example, if data is shared between twenty information reading apparatuses used in the predetermined reading task area, the first predetermined count N1th is set to 10. The first predetermined count N1th may be set to less than 10 (e.g., 5), or may be set to 10 or more (e.g., 20) according to the number of information reading apparatuses, the radio communication range of the information reading apparatuses, or the like.

As mentioned above, if an initial transmission count N1, as 1, is assigned to unread data because the unread data is data initially read by the information reading apparatus, the transmission count N1 should be not more than the predetermined number N1th, and thus a "Yes" determination should be made at step S121. In this case, step S111 described above is performed, and the unread data having the transmission count N1 is stored in the transmission buffer. Thus, the unread data, together with the transmission count N1, is transmitted to the plurality of information reading apparatuses including the second and third terminals 10b and 10c via the communication section 28 (step S203 of FIG. 5).

In the second terminal 10b, if the data received from the first terminal 10a is determined to be unread data (Yes at step S113 and Yes at step S107), the unread data is recorded in the memory 22 (step S109). Then, the transmission count increment process of step S119 is performed to increment the transmission count N1 of the unread data.

As described above, if unread data having an initial transmission count N1, as 1, is received by the second terminal 10b from the first terminal 10a, the transmission count N1 is incremented to 2. Then, if the transmission count N1 assigned to the data as a result of increment is determined to be not more than the first predetermined count N1th (Yes at step S121), step S111 is performed so that the unread data having the transmission count N1 is stored in the transmission buffer. Then, the unread data, together with the transmission count N1, is transmitted to the plurality of information reading apparatuses including the first and third terminals 10a and 10c via the communication section 28 (step S203 of FIG. 5).

Similarly, in the third terminal 10c, if the data received from the first terminal 10a is determined to be unread data (Yes at step S113 and Yes at step S107), the unread data is recorded in the memory 22 (step S109). Then, the transmission count increment process of step S119 is performed to increment the transmission count N1 of the unread data to 2.

Then, if the transmission count N1 assigned to the data as a result of increment is determined to be not more than the first predetermined count N1th (Yes at step S121), step S111 is performed so that the unread data having the transmission count N1 is stored in the transmission buffer. Then, the unread data, together with the transmission count N1, is transmitted to the plurality of information reading apparatuses including the first and second terminals 10a and 10b via the communication section 28 (step S203 of FIG. 5).

In the third terminal 10c, if it is determined that the data received from the second terminal 10b has already been received from the first terminal 10a and has been recorded in the memory 22 as already-read data (No at step S107), the already-read data is cancelled without incrementing the transmission count N1, and control returns to step S103, i.e. the third terminal 10c is brought into a state of reading a new radio tag 50.

In another information reading apparatus that has received data having the transmission count N1, as 10, for example, if the received data is determined to be unread data (Yes at step S113 and Yes at step S107), the unread data is recorded in the memory 22 (step S109). Then, the transmission count N1 is incremented to 11 in the transmission count increment process of step S119. At the subsequent step S121, the transmission count N1 is determined to be exceeding the first predetermined count N1th (No at step S121). Accordingly, without storing the unread data in the transmission buffer, control returns to step S103, i.e. this information reading apparatus is brought into a state of reading a new radio tag 50.

As described above, in the information reading apparatus 10 of the present embodiment, the control unit 21 performs the reading process as follows. Specifically, unread data is provided with a transmission count N1 that indicates the number of times of transmitting the unread data to other information reading apparatuses. When the unread data is transmitted, the transmission count N1 assigned thereto is incremented (step S119). Then, every time data received from another information reading apparatus is determined to be unread data (Yes at step S113 and Yes at step S107), the unread data is recorded in the memory 22. At the same time, the unread data, if determined to have a transmission count N1 of not more than the first predetermined count N1th (Yes at step S121), is transmitted to other information reading apparatuses via the communication section 28.

Thus, unread data is provided with a transmission count N1 which is incremented every time the unread data is transmitted to other information reading apparatuses. Moreover, the unread data whose transmission count N1 is not more than the first predetermined count N1th is ensured to be transmitted to other information reading apparatuses. If this transmission causes the transmission count N1 of the unread data to exceed the first predetermined count N1th, the unread data is no longer transmitted to other information reading apparatuses. Thus, even when there are a large number of information reading apparatuses to share data with, needless communication tasks or the amount of radio communication data can be minimized by adequately setting the first predetermined count N1th according to the number of information reading apparatuses, or the like.

Third Embodiment

An information reading apparatus and an information reading system according to a third embodiment will be described.

The third embodiment is mainly different from the first embodiment in that a predetermined notification is issued if data read by a worker is consecutively determined not to be unread data. The components substantially identical with or similar to those of the first embodiment are given the same reference numerals to omit duplicate description.

When reading tasks are performed by a plurality of workers in a predetermined reading task area, overlap of data can be avoided by sharing data between the workers as described above. However, each worker cannot know whether the reading targets in front of the worker have already been read by another worker. Therefore, a region where data has already been read by another worker may be read again by this worker in question, i.e. duplicated reading may occur.

In this regard, in a reading process performed by the control unit 21 of the present embodiment, a predetermined notification is issued. Specifically, the control unit 21 counts, as a determination count N2, the number of times of consecutively determining the data read by the worker herself/himself as not being unread data. If the determination count N2 exceeds a second predetermined count N2th, the control unit 21 issues a predetermined notification. Thus, the worker that has been given the predetermined notification is advised of her/his entry into a region where data has already been read, and can reduce the number of unnecessary tasks.

Figure 7:
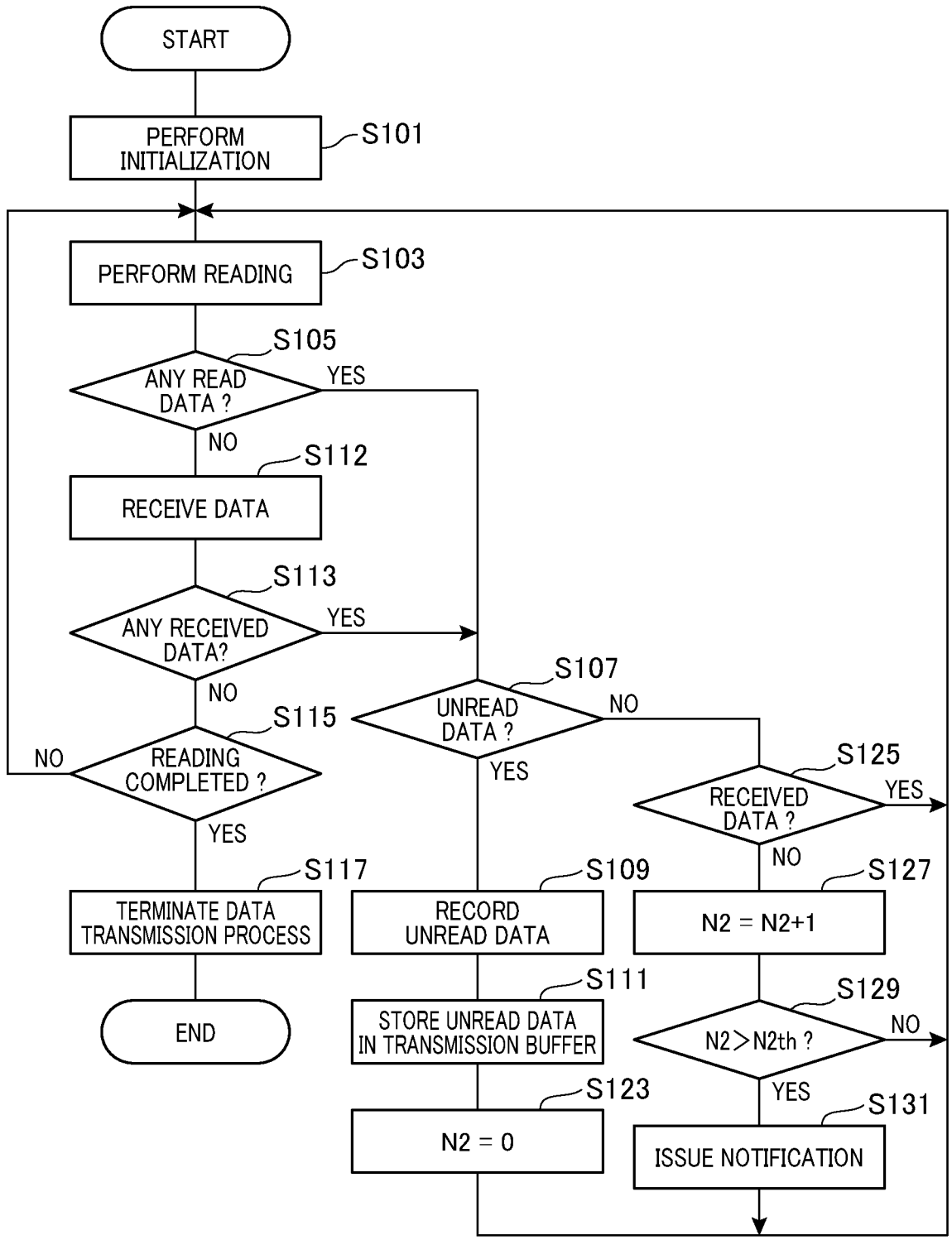
FIG. 7 is a flow diagram illustrating a reading process performed by a control unit, according to a third embodiment of the present disclosure.

Referring to the flow diagram of FIG. 7, the reading process performed by the control unit 21 of the present embodiment will be specifically described.

After start of the reading process by the control unit 21, if the data recorded on a radio tag 50 is determined to have been read through the radio tag processor 30 of the information reading apparatus (Yes at step S105 of FIG. 7) and if the data is determined to be unread data (Yes at step S107), the unread data is recorded in the memory 22 (step S109) and stored in the transmission buffer (step S111). Control then proceeds to step S123 where a determination count N2 is set to 0.

Then, if it is determined that data has been received from another information reading apparatus (Yes at step S113) and if the data is determined to be unread data (Yes at step S107), steps S109 and onward are performed. If the received data is determined not to be unread data (Yes at step S113 and No at step S107), control proceeds to step S125. At step S125, it is determined whether the data that has been determined not to be unread data has already been received. If the data that has been determined not to be unread data is determined to be received data (Yes at step S125), control returns to step S103, i.e. this information reading apparatus is brought into a state of reading a new radio tag 50.

Also, if the data recorded on a radio tag 50 is determined to have been read through the radio tag processor 30 of the information reading apparatus (Yes at step S105) and if the read data is already-read data recorded in the memory 22, a "No" determination is made at step S107. If the data has already been read by this information reading apparatus itself, the data will no longer be a reading target for this information reading apparatus, and thus a "Yes" determination will not be made at step S105. Accordingly, if already-read data, i.e. data received from another information reading apparatus and recorded in the memory 22, is read by this information reading apparatus in question for the first time from the radio tag 50, a "Yes" determination is made at step S105 but a "No" determination is made at step S107. Specifically, if the data of a radio tag 50 is read by a worker in a state of the worker entering a region where data has already been read by another worker, a "Yes" determination is made at step S105 but a "No" determination is made at step S107 due to sharing of data between information reading terminals as described above.

In the case where a "Yes" determination is made at step S105 and a "No" determination is made at step S107 as described above, the data determined not to be unread data (already-read data) is determined not to be received data (No at step S125). Accordingly, at step S127, the determination count N2 is incremented (N2=N2+1). For example, if a "No" determination is made for the first time at step S125, an initial count 1 is given to the determination count N2. It should be noted that the control unit 21 performing step S127 may correspond to an example of the count section.

Then, at step S129, it is determined whether the incremented determination count N2 exceeds a second predetermined count N2th. It should be noted that the second predetermined count N2th is determined according the work environments or the like of the predetermined reading task area. For example, if the second predetermined count N2th is set to 10 and the determination count N2 shows an initial count 1 as mentioned above, a "No" determination is made at step S129. Then, control returns to step S103, i.e. this information reading apparatus is brought into a state of reading a new radio tag 50.

Then, if the incremented determination count N2 is determined to have exceeded the second predetermined count N2th during the continuously performed reading tasks in the reading task area (Yes at step S129), control proceeds to step S131 where a notification is issued. At this step, textual information "Already read by another terminal" is indicated on the display 24 as a predetermined notification.

Being given this notification, the worker can easily know her/his entry into a region where data has already been read by another worker. In the notification process described above, the entry into a region where data has already been ready by another worker may be notified by another method, such as lighting or flashing of the LED 23, or issue of an alarm sound from the buzzer 27. For example, an audible notification of "Already read by another terminal" may be issued using a well-known speaker. It should be noted that the display 24, the LED 23, the buzzer 27 or the speaker may correspond to an example of the notification section.

When the worker that has been given the predetermined notification gets out of the already read region, and newly reads data recorded on a radio tag 50 and the data is determined to be unread data (Yes at step S105 and Yes at step S107), the unread data is recorded in the memory 22 (step S109) and stored in the transmission buffer (S111). Then, at the subsequent step S123, the determination count N2 is cleared As described above, according to the information reading apparatus 10 of the present embodiment, the number of times of consecutively determining data read by a worker as not being unread data is counted as a determination count N2. If the determination count N2 exceeds a second predetermined count N2th, a predetermined notification is issued through the display 24 or the like (step S131).

Thus, when a worker continues the reading task entering a region where data has already been read by another worker, the counted determination count N2 should exceed the second predetermined count N2th and the predetermined notification should be issued. This is because, even if this worker in question has not read the data by herself/himself in the past, the data received from this another worker has already been recorded in the memory 22 of this worker in question.

Thus, since the worker that has been given the predetermined notification can easily know her/his entry into a region where data has already been read by another worker, needless reading tasks are minimized. In particular, each worker, who can move avoiding issuance of the predetermined notification, can be directed to a region where data has not been read by another worker.

The characteristic configuration of issuing a predetermined notification if data read by the worker is consecutively determined not to be unread data, may be applied to other embodiments.

Fourth Embodiment

An information reading apparatus and an information reading system according to the fourth embodiment will be described.

The fourth embodiment is mainly different from the first embodiment in that there is provided a server which is capable of communicating with at least one of a plurality of information reading apparatuses used in a predetermined reading task area. The components substantially identical with or similar to those of the first embodiment are given the same reference numerals to omit duplicate description.

Figure 8:
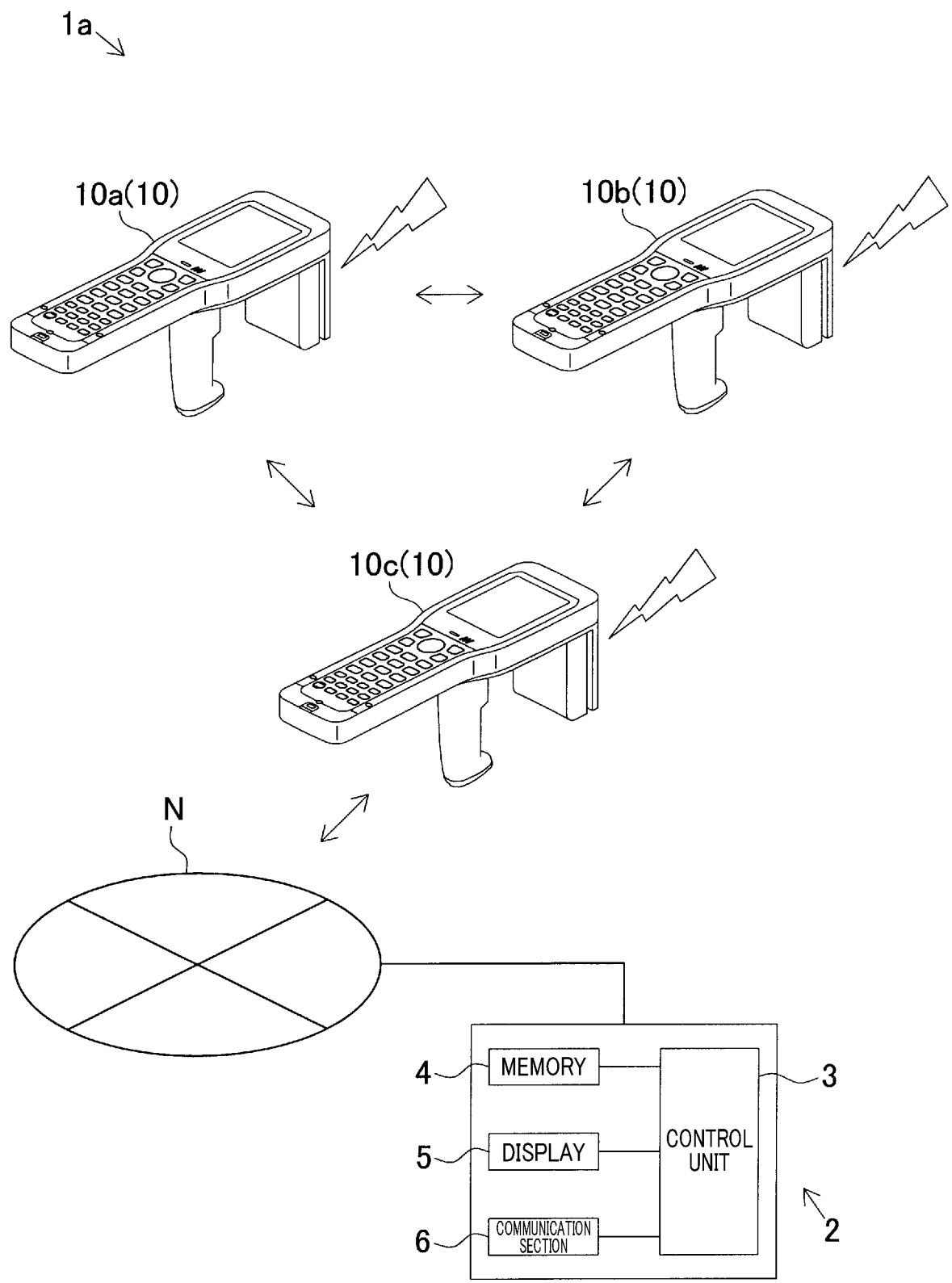
FIG. 8 is a schematic diagram illustrating a configuration of an information reading system, according to a fourth embodiment of the present disclosure.

FIG. 8 shows an information reading system 1a according to the present embodiment. The information reading system 1a includes a server 2 in addition to the plurality of information reading apparatuses including the first, second and third terminals 10a, 10b and 10c. The server 2 is configured to serve as a manager terminal that monitors the progress or the like of the reading tasks by acquiring data shared between the information reading apparatuses (the data may simply be termed common data hereinafter).

The server 2 mainly includes a memory 4, a display 5, a communication section 6, and a control unit 3 that collectively control these sections. The control unit 3 is mainly configured by a microcomputer, and includes a CPU, a system bus, and an input/output interface to serve as an information processor together with the memory 4. The memory 4 is configured by a known semiconductor memory, such as a ROM, a RAM, a nonvolatile memory, or the like. The memory 4 stores predetermined application programs, databases, and the like for executing a monitoring process described later and for use by the control unit 3.

The display 5 is configured, for example, to serve as a liquid crystal monitor or the like. The contents of indication of the monitor are ensured to be controlled by the control unit 3. The communication section 6 is configured to be controlled by the control unit 3, and to communicate with information reading apparatuses, such as the first, second and third terminals 10a, 10b and 10c, connected to a predetermined network N, such as a company LAN or Internet.

The server 2 configured as described above monitors the progress or the like of the reading tasks through a monitoring process performed by the control unit 3, i.e. monitors the progress by acquiring common data from a selected information reading apparatus specifically, in the monitoring process, the control unit 3 establishes communication with any one of the information reading apparatuses through the predetermined network N. When such communication is established, the control unit 3 gives a command to the information reading apparatus to cause this apparatus to transmit common data to the server 2. Upon reception of the command, the information reading apparatus performs a process of transmitting the common data recorded in the memory 22 to the server 2 through the predetermined network N.

When the data transmitted in this way is received through the communication section 6, the control unit 3 uses the acquired data as a basis for keeping track of the progress or the like of the reading tasks performed in the predetermined reading task area. The progress or the like grasped in this way is displayed on the screen of the display 5 with a predetermined display format. Thus, a manager or the like of the server 2, who has seen the display screen, can monitor the progress or the like of the reading tasks. It should be noted that the control unit 3 performing the monitoring process may correspond to an example of the task tracking section.

Each selected information reading apparatus may transmit common data every time it is connected to the predetermined network N, instead of transmitting common data in response to a command from the server 2. Alternatively, the server 2 may receive common data from an information reading apparatus with which radio communication can be established directly or through an access point or the like.

As described, the information reading system 1a of the present embodiment is provided with a server 2 which is capable of acquiring data recorded in the memory of any one of a plurality of information reading apparatuses used in a predetermined reading task area. Thus, the server 2 can keep track of the progress or the like of reading tasks performed in the predetermined reading task area, based on the data, i.e. common data, acquire from the information reading apparatus.

In this way, the server 2 can acquire common data from any one of the information reading apparatuses used in the predetermined reading task area, eliminating the process of acquiring data from all the information reading apparatuses and of compiling the acquired data. Thus, the server 2 can easily keep track of the progress of the reading tasks. Moreover, the manager or the like of the server 2 can make an adjustment of improving the efficiency of the tasks of the entire reading task area by changing positioning of the workers, increasing workers, or the like, according to the progress of the tasks.

The characteristic configuration in which the server 2 keeps track of the progress or the like of reading performed in the predetermined reading task area based on the common data acquired from an information reading apparatus, may be applied to other embodiments.

The present disclosure should not be limited to the embodiments described above, but may, for example, be embodied as follows.

(1) The communication section 28 is configured to have a Bluetooth (trademark) function or a near field communication (NFC) function to establish radio communication with other information reading apparatuses. Without being limited to this configuration, for example, the communication section 28 may be configured to have a radio communication function, such as a radio LAN function, using an access point or the like disposed in the reading task area.

(2) The present disclosure is applied to tasks of reading radio tags 50 attached to commercial goods and the like displayed on the shelves of a store by using a plurality of information reading apparatuses. However, without being limited to this application, the present disclosure may be applied, for example, to tasks of reading radio tags 50 attached to objects or the like stored in storage shelves of a factory warehouse, by using a plurality of information reading apparatuses. Alternatively, the present disclosure may be applied to tasks of reading objects, such as a plurality of information codes C disposed in a reading task area, by using a plurality of information reading apparatuses.

(3) In addition, the information reading apparatus according to the present invention can be provided as one or more information reading apparatuses loaded to one or more robots moving on one or more rails installed on, for example, a wall surface, a ceiling, or one or more racks on which goods are placed. Of course, such information reading apparatuses can be moved by hand. In any moving mode, the information reading applauses can communicate with RFID tags attached or placed on the goods, so that foregoing unread and already-read processes can be done solely or in parallel by the one or more information reading apparatuses during their movements, whereby the apparatuses can complete the reading work in a shorter work time, with the read and stored tag information shared among the apparatuses. This reading system can, of course, be realized by employing only a single information reading apparatus or by activating only one of a plurality of information reading apparatuses, in which the one information reading apparatus designed is simply responsible for the reading work in accordance with the foregoing control processes with no changes thereof.

(4) The present disclosure is applied to an information reading system of reading data recorded on reading targets by using three information reading apparatuses. However, without being limited to this configuration, the present disclosure may be applied to an information reading system of reading data recorded on reading targets by using two information reading apparatuses, or four or more information reading apparatuses.

What is claimed is:

1. An information reading apparatus comprising:
   an information reading section that reads data recorded on a reading target;
   a communication section that establishes radio communication with one or more other information reading apparatuses;
   a memory that records the data read by the information reading section;
   a first determination section that, every time the data is read by the information reading section, determines whether the read data is unread read data that has not been recorded yet in the memory;
   a second determination section that determines whether data received from each of the other information reading apparatuses through the communication section is the unread read data; and
   a control unit that controls data recorded in the memory, the control unit being configured to:
   i) record the unread read data in the memory and transmit the unread read data in the memory when the first determination section determines that the read data is the unread read data, and
   ii) store the data determined to be unread read data by the second determination section in the memory.

2. The information reading apparatus according to claim 1, wherein the control unit transmits all the read data recorded in the memory to the other information reading apparatuses through the communication section at a predetermined time point.

3. The information reading apparatus according to claim 2, wherein, when the data is determined to be the unread read data by the second determination section, the control unit records the unread read data in the memory, while transmitting the unread read data to other information reading apparatuses through the communication section.

4. The information reading apparatus according to claim 2, wherein:
the unread read data include transmission count that indicates a number of times of transmitting the unread read data to the other information reading apparatuses;
the information reading apparatus further comprises an increment section that increments the transmission count assigned to the unread read data, the transmission count being incremented when the control unit transmits the unread read data; and
when data is determined to be unread read data by the second determination section, the control unit records the unread read data in the memory, and transmits the unread read data, which has a transmission count that is not more than a first predetermined count, to the other information reading apparatuses through the communication section.

5. The information reading apparatus according to claim 4, further comprising:
a count section that counts, as a determination count, a number of times of consecutively determining data as not being unread read data by the first determination section; and
a notification section that issues a predetermined notification when the determination count exceeds a second predetermined count.

6. An information reading system comprising a plurality of information reading apparatuses, each of the plurality of information reading apparatuses comprising:
an information reading section that reads data recorded on a reading target;
a communication section that establishes radio communication with one or more other information reading apparatuses;
a memory that records the data read by the information reading section;
a first determination section that, every time the data is read by the information reading section, determines whether the read data is unread read data that has not been recorded yet in the memory;
a second determination section that determines whether data received from each of the other information reading apparatuses through the communication section is the unread read data; and
a control unit that controls data recorded in the memory, the control unit being configured to:
i) record the unread read data in the memory and transmit the unread read data in the memory when the first determination section determines that the read data is the unread read data, and
ii) store the data determined to be unread read data by the second determination section in the memory.

7. The information reading system according to claim 6, further comprising a server configured to acquire data recorded in the memory from at least any one of a plurality of the information reading apparatuses used in a predetermined reading task area, the server including a task tracking section that tracks a progress of reading performed in the predetermined reading task area based on the data acquired from the information reading apparatus.

8. The information reading apparatus according to claim 1, wherein, when the data is determined to be the unread read data by the second determination section, the control unit records the unread read data in the memory, while transmitting the unread read data to other information reading apparatuses through the communication section.

9. The information reading apparatus according to claim 8, wherein:
the unread read data include transmission count that indicates a number of times of transmitting the unread read data to the other information reading apparatuses;
the information reading apparatus further comprises an increment section that increments the transmission count assigned to the unread read data, the transmission count being incremented when the control unit transmits the unread read data; and
when data is determined to be unread read data by the second determination section, the control unit records the unread read data in the memory, and transmits the unread read data, which has a transmission count that is not more than a first predetermined count, to the other information reading apparatuses through the communication section.

10. The information reading apparatus according to claim 9, further comprising:
a count section that counts, as a determination count, a number of times of consecutively determining data as not being unread read data by the first determination section; and
a notification section that issues a predetermined notification when the determination count exceeds a second predetermined count.

11. The information reading apparatus according to claim 3, wherein:
the unread read data include transmission count that indicates a number of times of transmitting the unread read data to the other information reading apparatuses;
the information reading apparatus further comprises an increment section that increments the transmission count assigned to the unread read data, the transmission count being incremented when the control unit transmits the unread read data; and
when data is determined to be unread read data by the second determination section, the control unit records the unread read data in the memory, and transmits the unread read data, which has a transmission count that is not more than a first predetermined count, to the other information reading apparatuses through the communication section.

12. The information reading apparatus according to claim 11, further comprising:
a count section that counts, as a determination count, a number of times of consecutively determining data as not being unread read data by the first determination section; and
a notification section that issues a predetermined notification when the determination count exceeds a second predetermined count.

13. The information reading apparatus according to claim 2, further comprising:
a count section that counts, as a determination count, a number of times of consecutively determining data as not being unread read data by the first determination section; and
a notification section that issues a predetermined notification when the determination count exceeds a second predetermined count.

14. The information reading apparatus according to claim 1, further comprising:
- a count section that counts, as a determination count, a number of times of consecutively determining data as not being unread read data by the first determination section; and
- a notification section that issues a predetermined notification when the determination count exceeds a second predetermined count.

15. The information reading system according to claim 7, wherein the control unit transmits all the read data recorded in the memory to the other information reading apparatuses through the communication section at a predetermined time point.

16. The information reading system according to claim 15, wherein, when the data is determined to be the unread read data by the second determination section, the control unit records the unread read data in the memory, while transmitting the unread read data to other information reading apparatuses through the communication section.

17. The information reading system according to claim 16, wherein:
- the unread read data include transmission count that indicates a number of times of transmitting the unread read data to the other information reading apparatuses;
- each information reading apparatus further comprises an increment section that increments the transmission count assigned to the unread read data, the transmission count being incremented when the control unit transmits the unread read data; and
- when data is determined to be unread read data by the second determination section, the control unit records the unread read data in the memory, and transmits the unread read data, which has a transmission count that is not more than a first predetermined count, to the other information reading apparatuses through the communication section.

18. The information reading system according to claim 17, wherein each of the plurality of information reading apparatuses further comprises:
- a count section that counts, as a determination count, a number of times of consecutively determining data as not being unread read data by the first determination section; and
- a notification section that issues a predetermined notification when the determination count exceeds a second predetermined count.

* * * * *